US011712750B2

(12) United States Patent
Ly et al.

(10) Patent No.: US 11,712,750 B2
(45) Date of Patent: Aug. 1, 2023

(54) LASER DRILLING AND MACHINING ENHANCEMENT USING GATED CW AND SHORT PULSED LASERS

(71) Applicant: LAWRENCE LIVERMORE NATIONAL SECURITY, LLC, Livermore, CA (US)

(72) Inventors: Sonny S. Ly, Mountain House, CA (US); Jeffrey D. Bude, Livermore, CA (US); Gabriel Mark Guss, Manteca, CA (US); Wesley John Keller, Orinda, CA (US); Raluca A. Negres, Pleasanton, CA (US); Alexander M. Rubenchik, Livermore, CA (US); Nan Shen, Milpitas, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 108 days.

(21) Appl. No.: 17/040,155

(22) PCT Filed: Mar. 22, 2019

(86) PCT No.: PCT/US2019/023523
§ 371 (c)(1),
(2) Date: Sep. 22, 2020

(87) PCT Pub. No.: WO2019/183445
PCT Pub. Date: Sep. 26, 2019

(65) Prior Publication Data
US 2021/0001427 A1    Jan. 7, 2021

Related U.S. Application Data

(60) Provisional application No. 62/647,544, filed on Mar. 23, 2018.

(51) Int. Cl.
B23K 26/0622 (2014.01)
B23K 26/382 (2014.01)
(Continued)

(52) U.S. Cl.
CPC ...... B23K 26/0624 (2015.10); B23K 26/0604 (2013.01); B23K 26/382 (2015.10); H01S 3/2391 (2013.01)

(58) Field of Classification Search
CPC ............ B23K 26/0604; B23K 26/0608; B23K 26/0613; B23K 26/0622; B23K 26/0624;
(Continued)

(56) References Cited

U.S. PATENT DOCUMENTS 4,870,244 A    9/1989   Copley et al.
6,809,291 B1   10/2004  Neil et al.
(Continued)

OTHER PUBLICATIONS

International Search Report and Written Opinion of the ISA issued in PCT/US2019/023523, dated Jul. 4, 2019; ISA/KR.
(Continued)

*Primary Examiner* — William J Levicky
*Assistant Examiner* — Adam M Eckardt
(74) *Attorney, Agent, or Firm* — Harness, Dickey & Pierce, P.L.C.

(57) ABSTRACT

The present disclosure relates to a laser system for processing a material. The system may make use of a laser configured to intermittently generate a first laser pulse of a first duration and a first average power, at a spot on a surface of the material being processed, and a second laser pulse having a second duration and a second peak power. The second duration may be shorter than the first duration by a factor of at least 100, and directed at the spot. The second laser pulse is generated after the first laser pulse is generated. The first laser pulse is used to heat the spot on the surface (Continued)

FIGURE 1a of the material, while the second laser pulse induces a melt motion and material ejection of molten material from the melt pool.

23 Claims, 9 Drawing Sheets

(51) Int. Cl.
*B23K 26/06* (2014.01)
*H01S 3/23* (2006.01)

(58) Field of Classification Search
CPC ...... B23K 26/16; B23K 26/38; B23K 26/382; B23K 26/0643; B23K 26/06; B23K 26/00; H01S 3/0057; H01S 3/2391; H01S 3/00; H01S 3/23; C21B 13/004; C21B 13/0073; C21B 13/02; C21B 13/00; F27B 1/21; F27B 1/21; F27D 17/00; F27D 17/008; Y02D 30/70; Y02P 10/134
See application file for complete search history.

(56) References Cited

U.S. PATENT DOCUMENTS

| | | | |
|---|---|---|---|
| 7,173,212 B1 | 2/2007 | Semak | |
| 2006/0086702 A1 | 4/2006 | Smart | |
| 2010/0276405 A1* | 11/2010 | Cho | B23K 26/0622 219/121.72 |
| 2013/0068736 A1 | 3/2013 | Mielke et al. | |
| 2015/0372445 A1* | 12/2015 | Harter | G01J 11/00 372/25 |
| 2016/0318122 A1* | 11/2016 | Ota | B23K 26/402 |
| 2017/0141530 A1 | 5/2017 | Courjaud | |

OTHER PUBLICATIONS

C. Lehane, H.Kwok, *"Enhanced drilling using a dual-pulse Nd:YAG laser"*, Appl. Phys. A73. 45 (2001).
Forsman et al. *"Double-pulse machining as a technique for the enhancement of material removal rates in laser machining of metals"*, Journal of Applied Physics 98 (2005).
Extended European Search Report regarding Application No. 19771826.5, dated Oct. 28, 2021.

* cited by examiner

LASER DRILLING AND MACHINING ENHANCEMENT USING GATED CW AND SHORT PULSED LASERS

CROSS-REFERENCE TO RELATED APPLICATIONS

This application is a U.S. National Phase Application under 35 U.S.C. 371 of International Application No. PCT/US2019/023523, filed on Mar. 22, 2019, which claims the benefit of U.S. Provisional Application No. 62/647,544, filed on Mar. 23, 2018. The entire disclosures of the above applications are incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for laser material processing, and more particularly to systems and methods which make use of a combination of continuous wave (CW) gated and short pulse lasers to increase laser machining efficiency.

BACKGROUND

This section provides background information related to the present disclosure which is not necessarily prior art.

Cutting and drilling of materials, especially metals, is well-established in industry. Because laser processing is typically slower and more costly than conventional processes, it is typically used in high value applications where precision is required. It is also an important driver for laser source development, motivating improvements in both cost and throughput of short pulsed lasers. The desire to improve the efficiency of laser drilling and cutting also drives the exploration of new approaches which optimize the laser material interactions involved in the ablation process itself. When a laser pulse interacts with a metal surface, it vaporizes a thin (10 to 100 nm) layer of material, leaving behind a melt layer. The energetic cost of removing material as a vapor is high, since much of the energy of the laser pulse goes into heating the vapor. For short pulses (picosecond to femtosecond), this deeper melt layer is also typically very shallow; it is often expelled by explosive boiling when heated beyond the critical point, though especially for higher laser fluences, it can be expelled by cavitation. Material removal by explosive boiling is also inefficient taking up to $10^6$ Joules to remove a cubic centimeter of material ($\eta=10^6$ J/cm$^3$). For longer pulses (nanosecond and longer) in which the laser intensity is much less than for the shorter pulses, vaporization and explosive boiling can be minimized, and more energy goes to creating a deeper melt layer. Removal of the melt will result in efficient ablation. However, the melt is held tightly to the surrounding material by surface tension, and in deep channels created by high aspect ratio drilling, the melt can be very difficult to remove. This limitation can be overcome in some industrial processes through use of high-pressure gas, however, the effectiveness of this approach is reduced in high aspect ratio channels, for very fast drilling or cutting, for thick materials, or in cases where some stand-off is required such that the laser is not proximate to the surface.

Instead of using a gas-assist, researchers investigated use of a second laser pulse to expel the melt—the initial double pulse concept. The use of a two pulse scheme was proposed in C. Lehane, H. Kwok. "*Enhanced drilling using a dual-pulse Nd:YAG laser*", Appl. Phys. A73. 45. 2001. In this work, a dual-head Q-switched Nd:YAG laser was used to produce two pulses with adjustable timing: a 22.5 J ms-long laser pulse used to create a deep melt in stainless steel (SS) with little to no vaporization, and a second, 2.5 J 100 µs-long laser pulse timed to interact with the melt surface after a maximal melt depth was reached. They found that this double pulse combination could increase removal by up to a factor of 10×; based on the data they reported, we estimate a reduction of $\eta$ to $1.5\times10^6$ J/cm$^3$ for a 550 µm diameter, 1 mm deep channel in SS. Also the optimization of parameters and ejection mechanism were not discussed. Up to now, the practical implementation of this idea is complicated by the low efficiency of the pulsed lasers, their relatively large size, and the high cost involved. These drawbacks make the practical application of such a system difficult to implement in industrial applications.

Another previously proposed laser processing scheme used a burst or train of short laser pulses, attempting to make use of the residual heat from the previous pulse. Forsman et al. "*Double-pulse machining as a technique for the enhancement of material removal rates in laser machining of metals*", Journal of Applied Physics 98. (2005), investigated the removal process in SS and Aluminum (Al) using double pulses from the same 532 nm 3 ns laser (pulse separations up to 150 ns), also finding improvements to removal per pulse. Based on their data reported, we estimate their efficiency $\eta=7.5\times10^5$ J/cm$^3$ for SS, and $2.4\times10^5$ J/cm$^3$ for Al for 900 µm deep, 40 µm diameter channels using 2.4 mJ pulses (~100 J/cm$^2$). While it is possible that some of the improvement could have been due to melt ejection, they ascribe the increased efficiency to processes resulting from the interaction of the second pulse with the ejecta plume from the first pulse. With this type of system, typically the gain in the removal rate is not large.

Accordingly, there remains a strong interest in increasing the removal efficiency and penetration rate of laser-based machining systems, as well as gaining a better understanding of hydrodynamic melt instabilities which affect the efficiency of such laser based systems.

SUMMARY

This section provides a general summary of the disclosure, and is not a comprehensive disclosure of its full scope or all of its features.

In one aspect the present disclosure relates to a laser system for processing a material. The laser system may comprise a laser configured to intermittently generate a first laser pulse of a first duration and a first average power, at a spot on a surface of the material being processed, and a second laser pulse having a second duration and a second peak power. The second duration is shorter than the first duration by a factor of at least 1000, and directed at the spot, and the second laser pulse is generated after the first laser pulse is generated. The first laser pulse from the laser is configured to heat the spot on the surface of the material, while the second laser pulse ejects material from the spot.

In another aspect the present disclosure relates to a laser system for processing a material. The laser system may comprise a gated continuous wave (CW) laser producing a first laser pulse of a first duration and a first average power, at a spot on a surface of the material being processed. The system may further include a short pulsed laser for producing a second laser pulse having a second duration and a second peak power, the second duration being shorter than the first duration by a factor of at least 1000 and directed at the spot. The second laser pulse is generated after the first laser pulse is generated. The first laser pulse from the CW laser is configured to at least heat the spot on the surface of the material, while the short pulsed laser ejects from the spot.

In still another aspect the present disclosure relates to a laser-based method for processing a material. The method may comprise using a laser to intermittently generate a first laser pulse of a first duration and a first average power, at a spot on a surface of the material being processed. The method may further include using a second laser pulse having a second duration and a second peak power, the second duration being shorter than the first duration by a factor of at least 1000, and being directed at the spot. The pulse length of the short pulse should be about nanoseconds or shorter and the pulse length of the long pulse should be about microseconds or longer. The peak power of the short pulse part should be at least 1000 times higher the than the average power of the long pulse part. The second laser pulse is generated after the first laser pulse is generated. The method may further include using the first laser pulse to at least heat material at the spot, and using the second laser pulse to induce ejection of material at the spot.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The melt enthalpy for metals are usually a few times smaller than the evaporation enthalpy. Pulsed lasers usually remove material via evaporation and their efficiency is intrinsically low. Continuous wave ("CW") lasers melt the material but to remove the melt requires the recoil momentum produced by the extensive evaporation. To overcome the surface tension, the evaporation must be intensive and should occupy most of the spot being acted on. In this situation the laser light starts to interact with the vapor plume, which shields the metal surface and leads to a decrease the efficiency of material removal. Also, refraction and scattering in the plume degrades the efficiency and precision of the processing.

The present disclosure broadly relates to the use of a combination of a gated CW laser providing a long, low average power pulse and a short pulsed (nanosecond-picosecond) laser providing a short, high peak power pulse to even more efficiently cut and/or laser machine holes in various types of materials, and particularly metals such as aluminum and stainless steel, although its use is not constrained to these materials. The disclosure also relates to the use of a single laser configured to produce a shaped pulse substantially similar to the combination of pulses produced by the combination of the gated CW laser and the short pulsed laser scheme just described: a pulse having a first part which is long and low average power, and a second part which is short with high peak power. In both embodiments, the long pulse is typically longer than about 1 µs and the short pulse is typically in the nanosecond regime or shorter.

In particular, the peak power in the short pulse part may be at least 1000 times the average power of the long pulse part and the duration of the short pulse part may be at least about 1000 times shorter than the duration of the long pulse part. In a preferred embodiment, the duration of the long pulse part is greater than 1 µs, and the duration of the short pulse part is less than 1 ns. Furthermore, the peak power of the short pulse part may be about $10^5$ times the average power in the long part of the pulse and about $10^5$ times shorter in duration than the duration of the long pulse part. These target intensities and related pulse lengths are set by the physical processes produced by the long and short pulses For example, in one implementation the average power of the long pulse part should be sufficient to provide an irradiance when focused on the sample being processed sufficient to melt the sample but not so high that it produces a significant plasma; a typical value for the power of the long pulse may be about 250 W to 1500 W, and more preferably about 500 W to 1 kW, when the focused spot size on the sample is about 200 µm, such that the irradiance on the sample is less than about 1 MW/cm$^2$. The peak power of the short pulse part should be sufficient to provide an irradiance on the sample being processed sufficient to excite instabilities in the melt produced by the long pulse such that a significant volume of the melt is expelled from the sample; a typical value for the peak power of the short pulse part is about 1 GW when the focused spot size on the sample is about 200 µm, such that the irradiance on the sample is more than about 100 GW/cm$^2$. It is obvious to one practiced in the art that the required power for both pulses is larger when the focused spot size on the sample is larger. The required peak power for the short pulse does not scale with the spot size. In this example, the peak power of the short pulse is preferably at least 1000 times the average power of the long pulse. While it is desirable that the short pulse immediately follow the long pulse, it is not necessary. The desired benefits of this invention can still be obtained if there is a short delay between the long and short pulse parts. This delay should, however, be short enough that the melt achieved by the long pulse does not significantly cool prior to the arrival of the short pulse part. The larger the spot, the longer this delay can be.

Figures 1, 1A:
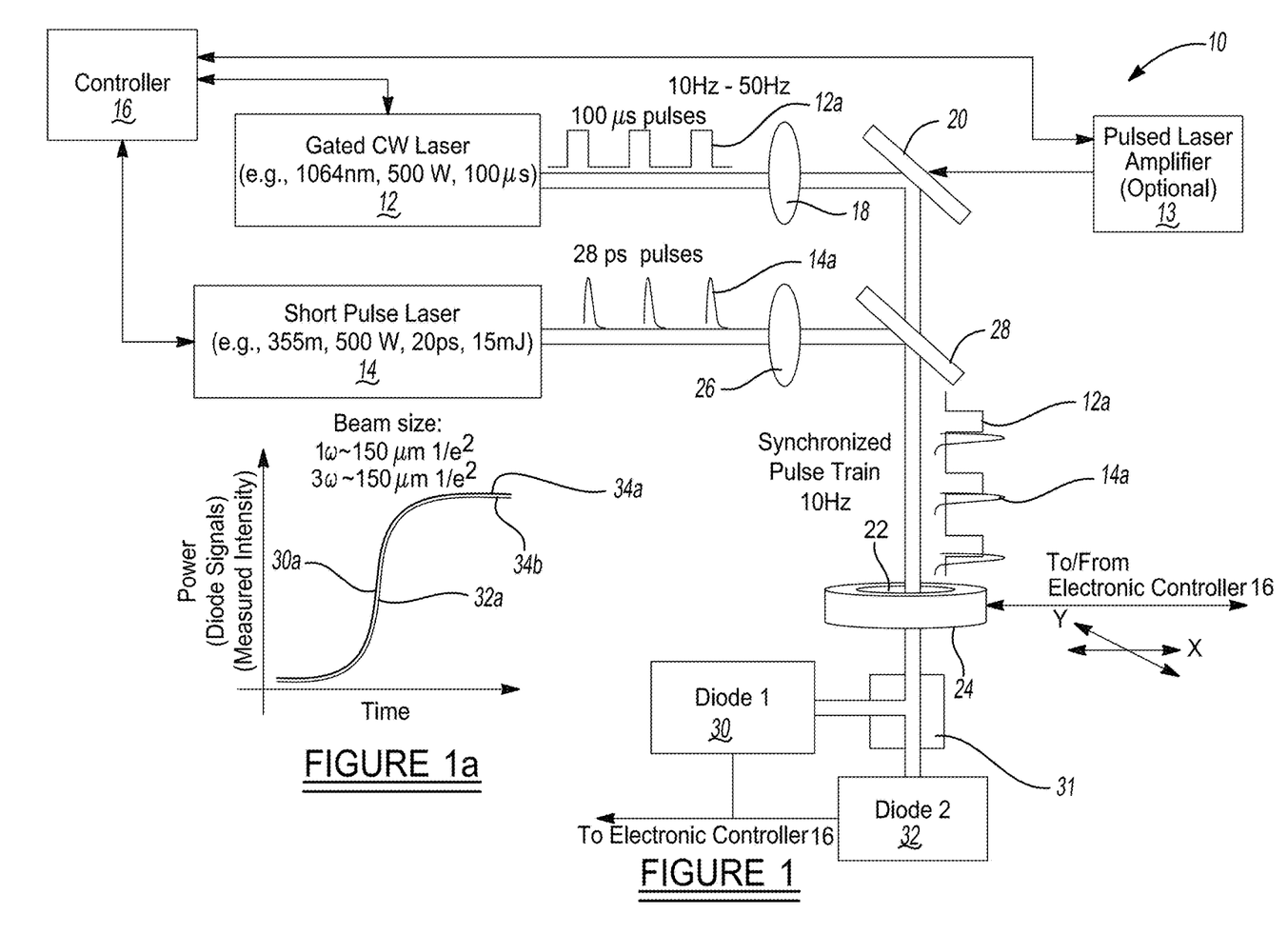
FIG. 1 is high level block diagram of one embodiment of a laser machining system in accordance with the present disclosure, which employs a gated CW laser and a short pulsed laser for material processing.
FIG. 1a is a graph of diode signal power versus time for the two diodes shown in FIG. 1, which illustrates how light from the pulses of the CW laser and the pulsed laser are detected as they gradually make their way through the thickness of the material sample.

Referring to FIG. 1, a system 10 in accordance with one embodiment of the present disclosure is shown. The system 10 may include a gated continuous wave (CW) laser 12 and a short pulsed laser 14, both of which are controlled by a controller 16 such that "on" and "off" operation of the lasers 12 and 14 are synchronized at a desired, predetermined frequency. The predetermined frequency may vary considerably, but in one example may be, without limitation, from about 10 Hz to about 50 Hz. The CW laser 12 in this example is configured to produce pulses 12a having a duration of between about 10 µs to 500 µs, and more preferably about 100 µs, although this pulse duration may be varied to optimize material removal from specific materials. The short pulsed laser 14 in this example produces pulses 14a having a duration of 20 µs, and this pulse duration may also be varied to suit the needs of specific applications. The wavelength of both lasers may be in the near-IR range (a common choice is near 1 µm), but better performance can often be achieved using a shorter wavelength for the short-pulsed laser, for instance, in the visible range near 500 nm or in the ultra-violet range near 355 nm. We have found that shorter wavelengths produce stronger shocks which better initiate melt instabilities more easily removing the melt layer. The CW laser may also use a shorter wavelength which is more readily absorbed by the material being processed; however, given today's technology, true CW lasers operating in the visible or UV range are typically lower power than those operating in the IR and may not be suitable for melting common materials such as metals.

The depth of the melt produced by CW laser increases with laser power and irradiation time. It is evident that there exist an optimal CW pulse duration. For short CW laser duration the melt depth is too small to use all scheme's benefits. For long pulses the melt depth is deeper than the short pulsed laser is able to eject and the process efficiency drops. The optimal choice of process parameters depends on the processed materials and the used lasers. The parameters used in our experiments provides a huge efficiency enhancement in comparison with traditional single laser schemes, even if they are not fully optimal.

Optionally, a single CW laser could be used to produce a shaped pulse having a long and short pulse part. Use of a single laser can be desirable since there is no need to independently align the CW laser beam to the short pulse beam. This aspect of a single laser solution is especially useful when the standoff distance between the laser and the sample gets larger or when the sample being processed is thicker. In this case, its pulse width is controlled to produce successive pairs of pulses, one having a duration of between about 10 µs to 500 µs, and more preferably about 100 µs, and the other having a duration of about 1 µs to 100 µs, and more preferably about 20 µs, which is produced immediately upon the end of the 100 µs pulse, with the two pulses repeated at a predetermined frequency. However, in practice it would quite difficult to obtain the requisite target power and irradiance on sample from the second pulse using a gated CW laser.

Figure 7A:
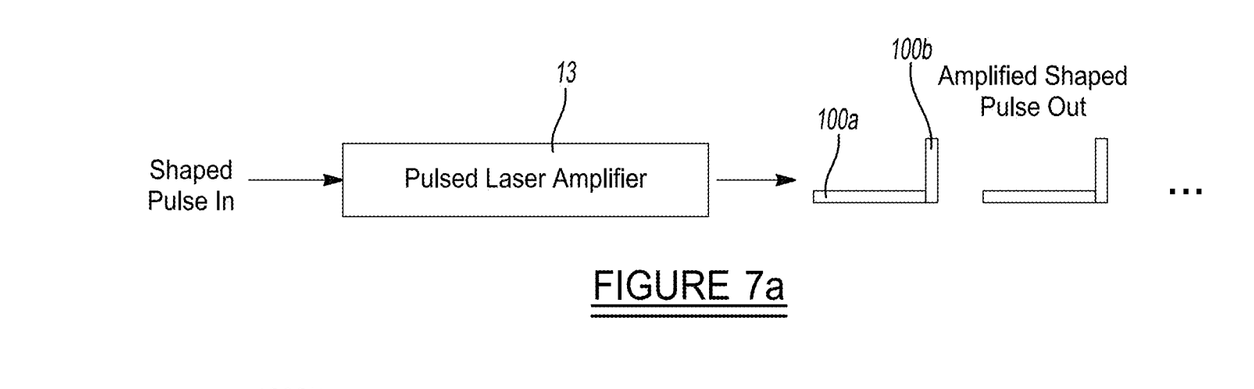
FIG. 7a shows a preferred embodiment of this invention whereby the desired pulse shape is produced by a single pulsed laser amplifier.
Figure 7B:
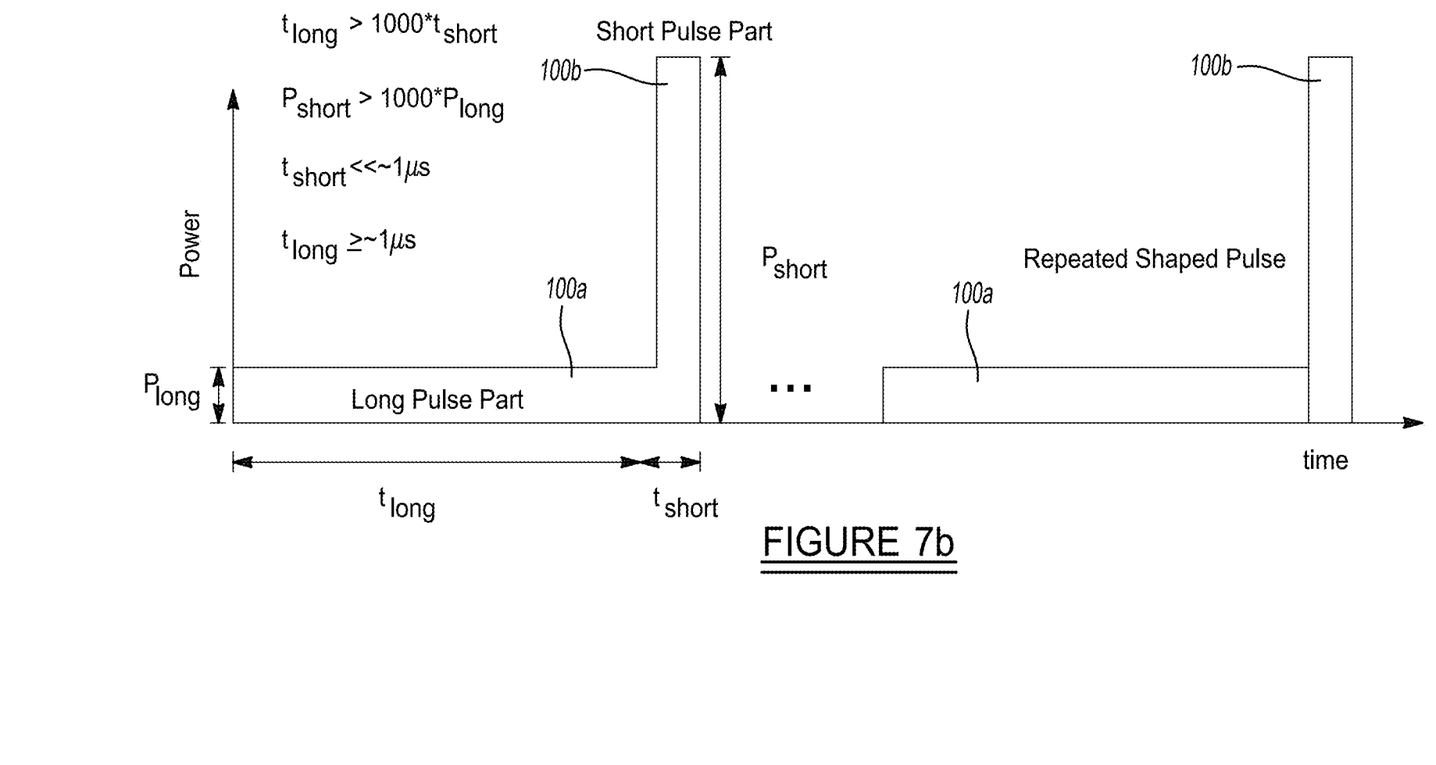
FIG. 7b shows the class of pulse shapes produced by the preferred embodiments of this invention; these pulses can be produced by the combination of a CW laser and a pulsed laser, or by a single laser.
Figure 7C:
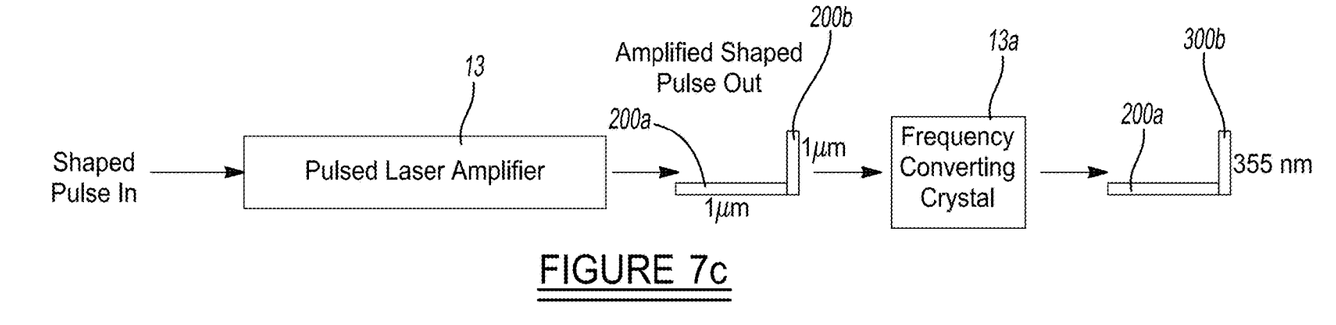
FIG. 7c shows a single pulsed laser equipped with a frequency converter at the output of the amplifier such that the short pulse part of the desired shaped pulse is frequency converted to a shorter wavelength (<1 µm) while the wavelength of the long pulse part is not converted and remains at 1 µm.
Figure 7D:
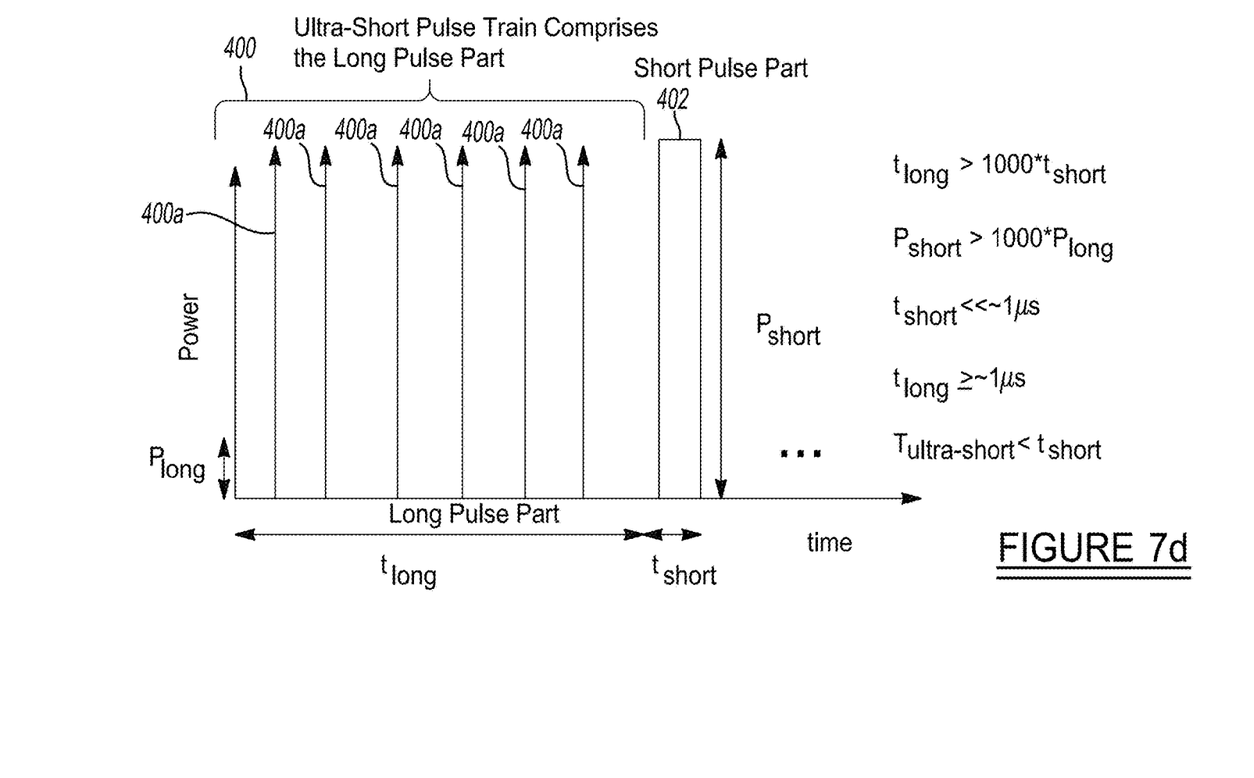
FIG. 7d illustrates a pulse shape for which both the long pulse part of the desired pulse shape and the short pulse part can be frequency converted to a shorter wavelength; here the long pulse part is composed of a pulse train of ultra-short pulses having the same average power as the desired long pulse part and similar peak power to the short pulse part; the pulse length of the ultra-short pulse part is shorter than the short pulse part and has less pulse energy.

Another preferred embodiment of the present invention, as shown in FIG. 7a, uses a single pulsed laser amplifier 13 to produce a shaped pulse having a long pulse part 100a and short pulse part 100b with the required duration and power. FIG. 7b illustrates where the pulse length of the long pulse is at least 1000 times longer than the pulse length 100a of the short pulse part and the peak power of the short pulse part is at least 1000 times greater than the average power of the long pulse part. Such a scheme would have the same benefits as the two-laser approach described above. For example, a single pulsed laser could be configured to produce a first long pulse part having a duration of about 10 µs to 500 µs, and more preferably a 100 µs duration low average power, such that the irradiance on the sample is less than about 1 MW/cm$^2$ followed by a short duration high intensity pulse, for example of 1 µs to 100 µs in duration, and more preferably a 20 µs duration high intensity part, and having an peak power such that the irradiance on the sample is about 100 GW/cm$^2$. Optionally, a frequency convertor 13a, as shown in FIG. 7c, may be included after the amplifier output such that it converts the high peak power short duration part of the pulse to a harmonic of the amplified light. A common example would be the use of a Nd-doped glass amplifier which nominally produces light with a wavelength of 1 µm. The long, low average power portion of the pulse will not be converted and will pass through the converter as 1 µm light, but the high power portion of the pulse could be converted to either the second harmonic near 500 nm or the third harmonic near 355 nm. As noted before, shorter wavelength light has been found to be more effective in exciting melt instabilities that 1 µm light. Additionally, a system configured with the optional frequency converter 13a can also be used to convert the low average power portion of the pulse used to create the melt to a short wavelength. This may be achieved by configuring the low average power portion 400 of the pulse such that it is composed of a pulse train of ultra-short pulses 400a having the same average power as the desired long pulse part, and with the same peak power as the short pulse part 402, so that is it frequency converted, as shown in FIG. 7d. The pulse length of the ultra-short pulses 400a should be shorter than the short pulse part 402 so that each ultra-short pulse 400a contains less energy than the pulse energy of the short pulse part 402; in this way, the ultra-short pulses 400a act only in an average sense and produce heating but do not create sufficient pressure to initiate melt instabilities.

If the pulse repetition frequency is high, residual temperature build up can cause cracking and heat affected zone around the melt spot. If the frequency is low, interaction between the train of pulses are independent. The transition between the two regimes depends on the type of material being processed, the spot size of the two pulses being applied, and the total laser fluence being applied. The predetermined pulse repetition frequency, again, may be about 10 Hz to about 50 Hz. In using a frequency of 10 Hz to 50 Hz, the drilling rate was not affected.

Both dual laser and single laser implementations are contemplated by the present disclosure. With further reference to FIG. 1, the pulses 12a from the gated CW laser 12 may be focused using a suitable first optic (e.g., lens) 18, and then reflected using a mirror 20 or other suitable optic onto a material sample 22 supported on a stage 24. The stage 24 may be movable in X and Y planes, with its movement controlled by the controller 16 and/or a separate controller. A suitable second optic (i.e., separate lens) 26 may be used to focus the pulses 14a from the pulsed laser 14, before using an additional mirror or suitable optic 28 to turn the pulses 14a toward the sample 22. The optic 28 allows the pulses 12a to pass therethrough while turning the pulses 14a. A beamsplitter 31 is used to separate the signal from the CW laser and short pulsed laser. Optionally, diode 30 may be used to detect the intensity of the beam which is providing pulses 12a as the pulses work through the thickness of the material sample 22. Optionally, in a similar manner, diode 32 may be used to detect the intensity of the beam producing the pulses 14a as the pulses 14a work through the thickness of the material sample 22. FIG. 1a illustrates curves 30a and 32a, with curve 30a representing the output from the diode 30, and curve 32a representing the output from the diode 32. The curves 30a and 32a have virtually the same intensity vs. time profiles and indicate the intensities of the pulses 12a and 14a as the pulses drill through the material sample 22. Section 34a and 34b indicate that the pulses 12a and 14a have passed fully through the material sample 22, and thus maximum measured intensity is reached for the pulses 12 and the pulses 14a.

Figure 2A:
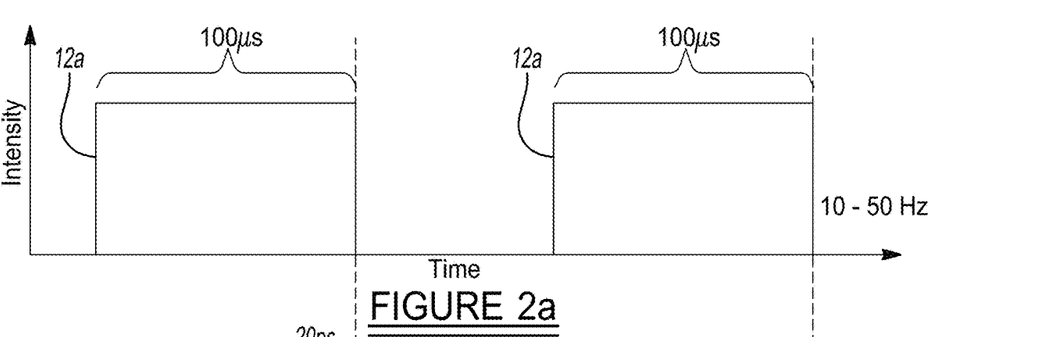
FIG. 2a is timing diagram showing the pulses generated by the Gated CW laser of FIG. 1, which in this example are shown as having a period of 100 µs.
Figure 2B:
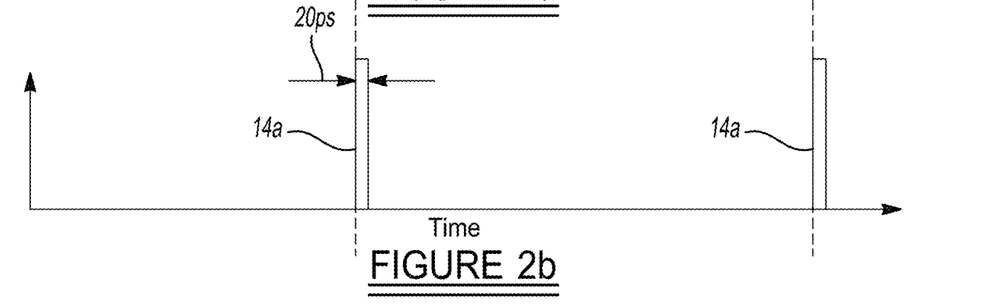
FIG. 2b is a timing diagram illustrating the short duration pulses generated by the pulsed laser in FIG. 1, which are gated at the end of each pulse produced by the CW laser, and which in this example have a period of only 28 µs.

An important aspect of the system 10 is that the controller 16 controls the timing of the pulses generated by the gated CW laser 12 and the pulsed laser 14 such that the short duration pulses 14a are generated at the end of duration of each pulse 12a. This is shown in FIGS. 2a and 2b. More preferably, the short duration pulses 14a are generated such that they are present immediately upon the pulse 12a ending, or just prior to the end of each pulse 12a. this regard, a small degree of overlap of the two pulses 12a and 14a may be present just before the first pulse 12a terminates. The spot sizes of the beams used to produce the pulses 12a and 14a may vary, although it is expected that using the same spot size for pulses 12a and 14a may simplify implementation of the system 10, although the present disclosure is not limited to using the same spot sizes. In one example the spot size may be 150 μm in diameter for both pulses 12a and 14a. The spot sizes used in the experiments here are similar, both at 150 um 1/e2, but the optimal relation between the two beam spot sizes depend on the material and material thickness. The pulses 12a from the gated CW laser 12 create a melt pool on the sample 22 surface. The melt temperature and depth is controlled by the power of the CW laser 12 and the spot size of the CW pulse 12a. The pulses 14a from the pulse laser 14 create the shock and initiate cavitation on the melt pool which operates to eject particles of the molten material from the spot that the pulses 14a and 12a are impinging (i.e., from the melt pool).

In specific experiments, a CW duration of about 100 μs was used. The CW laser 12 power was selected to achieve a desired extent of the melt pool when the short pulse 14a arrives. The evaporation of the thin layer of metal produces the recoil momentum, which ejects the melt. The viscosity of the melt is small, and does not affect the melt dynamics. The energy of the short pulse 14a which ejects the material is small in comparison with the energy of the CW laser pulse 12a. For example, a 450 W CW laser at 100 us duration is 45 mJ and the short pulse energy is 3 mJ. By applying multiple double pulses (i.e., one pulse 12a followed immediately by one pulse 14a), one is able to drill high aspect ratio (>10) holes, with the aspect ratio defined as the ratio of the hole depth to the diameter. The experimental data for hole drilling with diameter 150 μm is presented on FIG. 2, which shows the removal rate as a function of hole depth for aluminum (Al) and stainless steel.

Figure 3A:
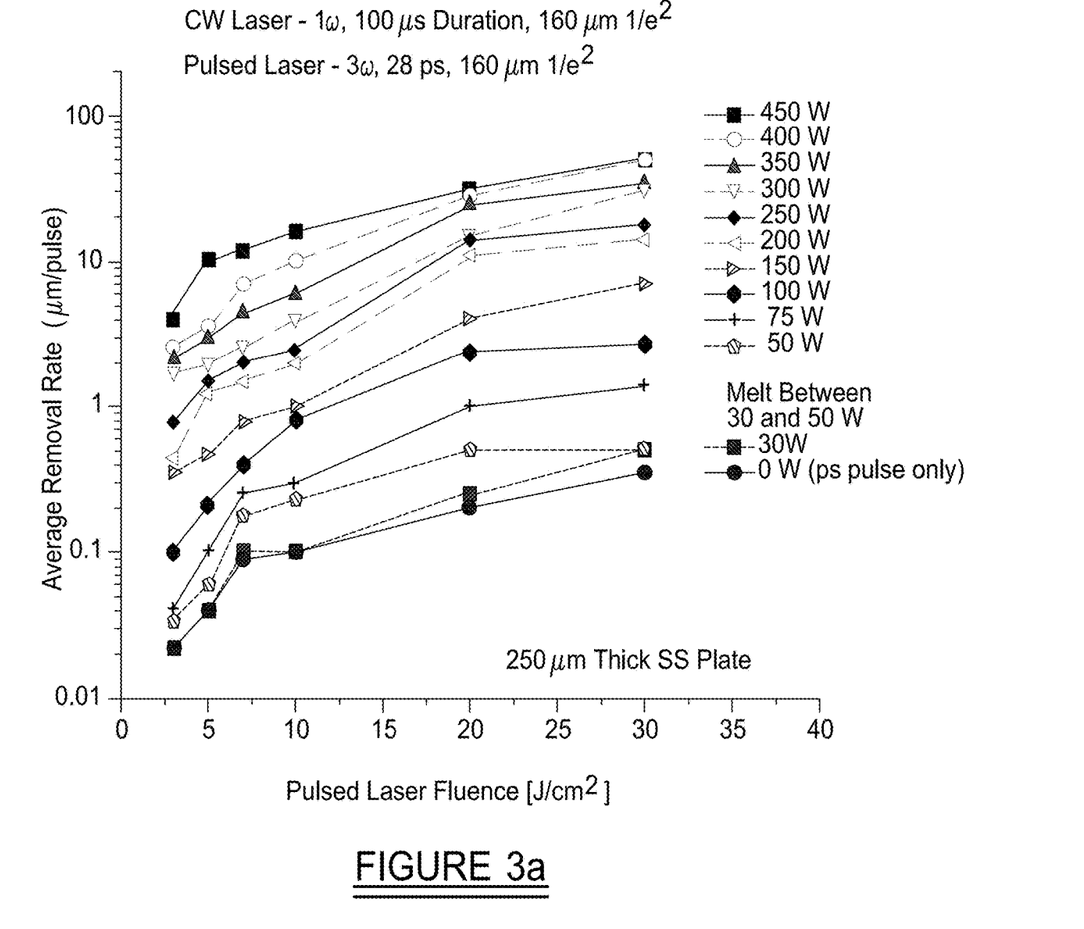
FIG. 3a shows a graph illustrating removal rate vs pulsed laser fluence produced by the present disclosure for removal of 316L stainless steel.
Figure 3B:
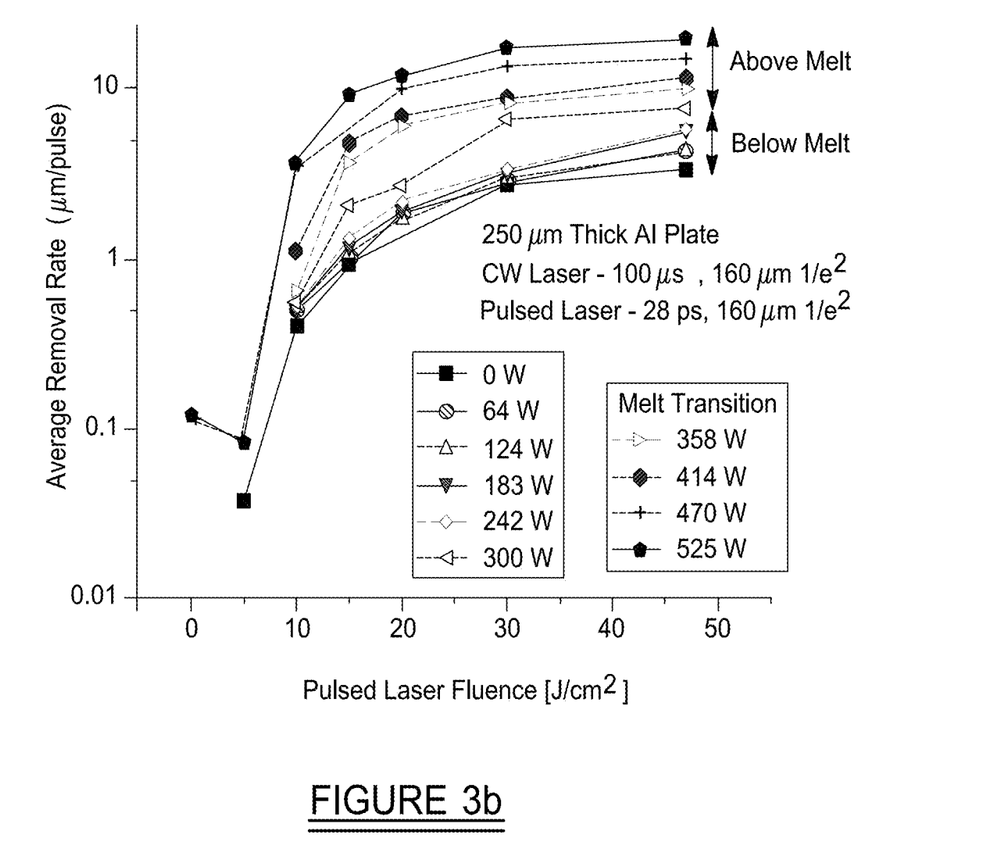
FIG. 3b shows a graph illustrating removal rate vs pulsed laser fluence produced by the present disclosure for removal of aluminum alloy 6061 stainless steel.

FIG. 3 graphically illustrates the removal rates (μm/pulse) of a material as a function of pulsed laser fluence 14 for various CW laser power 12 levels. The Example shown in FIG. 3a depicts Al alloy 6061 and FIG. 3b depicts SS316L stainless steel. The power of the CW laser needed to produce melt depends on the sample material. The thresholds for melt pool formation for 100 is CW pulses are estimated to be ~50 W for SS and ~300 W for Al. When the CW laser power is above the melt threshold, the average removal rate of the drilling improves significantly. We observe a >10× enhancement for drilling SS using 450 W CW laser power, and >5× for Al.

Figure 4A:
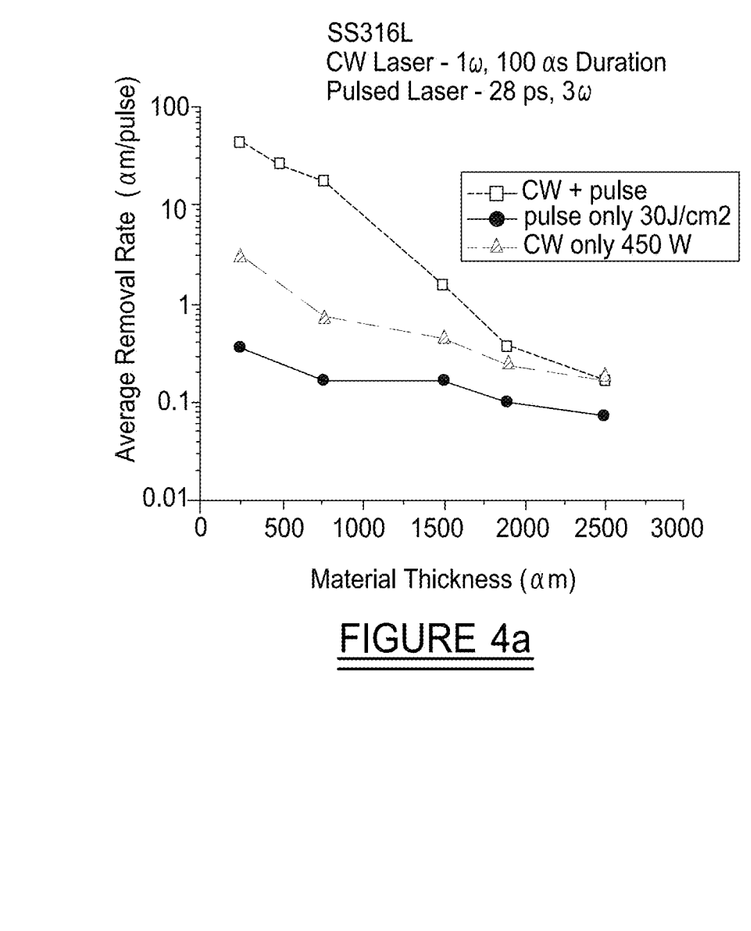
FIG. 4a shows a graph illustrating removal rate vs. thickness produced by the present disclosure for removal of aluminum alloy 6061.
Figure 4B:
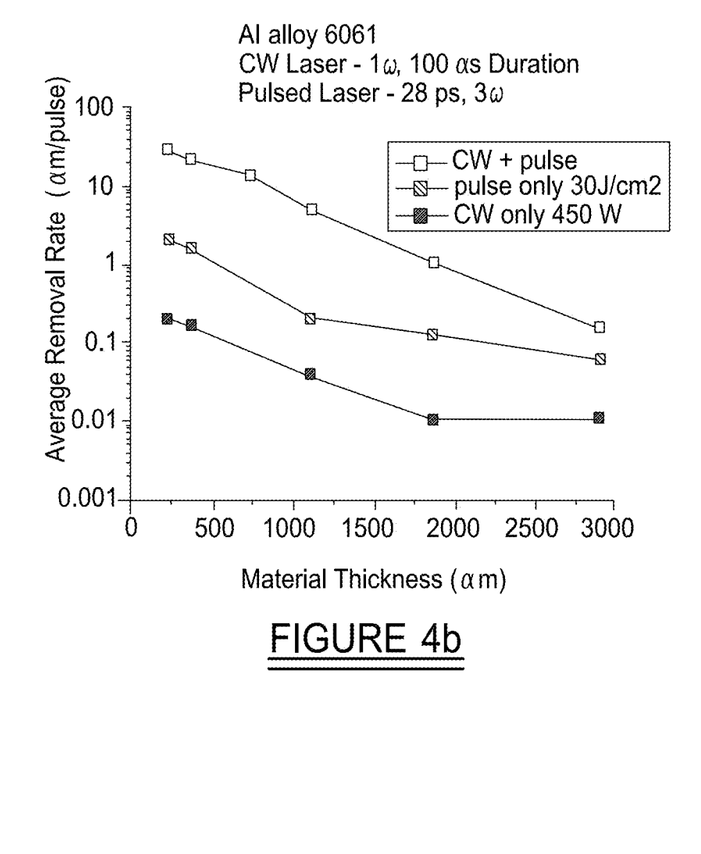
FIG. 4b shows a graph illustrating removal rate vs. thickness produced by the present disclosure for removal of 316L stainless steel.

FIGS. 4a-4b graphically illustrate the removal rates of a material as function of material thickness for Al alloy 6061 (FIG. 4a), using just a CW pulse (450 W) (curve 100), using just a pulse (30 J/cm$^2$) from a pulsed laser (curve 102), and using both the CW laser 12 and the pulse laser 14 (curve 104). FIG. 4b illustrates the material removal rate of 316L stainless steel, where curve 110 is just the removal produced by the CW laser only, curve 112 represents the removal produced by just the pulsed laser, and curve 114 represents the material removal using both the CW laser 12 and the pulse laser 14 as described herein. It is important to note, that when a longer duration, lower power short pulse laser is used, the removal enhancement is reduced and/or disappears. For example, we have found that when the 20 μs short pulse laser is replaced by a 7 ns pulsed laser having the same wavelength and average fluence on target, the removal enhancement for metal samples thicker than about 250 μm disappears. The peak power in the 20 μs pulse is greater than 1 GW, over $10^6$ times higher than the average power from the gated CW laser 12. In contrast, the peak power in the pulse produced by the 7 ns pulsed laser is on the order of 1 MW, only about 2000 times the average power from the gated CW laser. The peak power of the 7 ns laser is at the margin of usefulness as it was found to enhance removal for samples up to 250 μm thick, but as noted, did not enhance removal for samples thicker than 250 μm. Clearly the higher the peak power of the short pulse part, the higher the removal efficiency becomes. For a desired long pulse average power and duration, this means that the higher the ratio of the peak power of the short pulse part to the average power of the long pulse part, the higher the removal. We have determined this ratio is at least a factor of 1000. Therefore, to summarize the above, the pulse length of the short pulse should be about nanoseconds or shorter and the pulse length of the long pulse should be about microseconds or longer. The peak power of the short pulse should be at least 1000 times higher the than the average power of the long pulse part.

Figure 5:
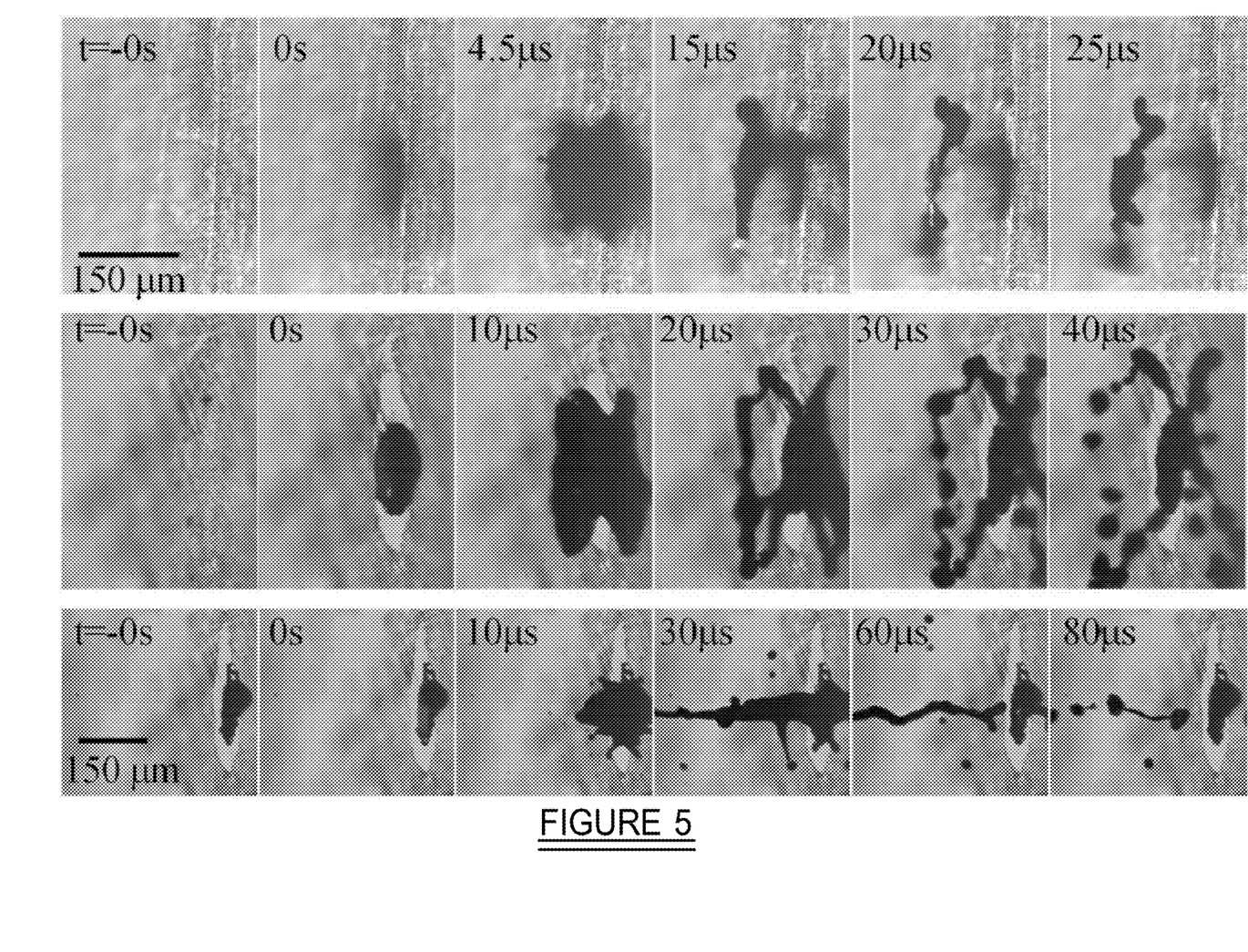
FIG. 5 shows melt ejection occurring at five different times during a processing cycle using the system of the present disclosure. Top row shows cavitation of a melt layer, middle row shows breaking of molten liquid droplets, and bottom row shows ejection of a molten liquid jet.

FIG. 5 illustrates frames from high speed video detailing the melt ejection occurring at six different times. Essentially, the pulse 12a rapidly forms a melt pool, and the pulse 14a acts like a "hammer" to eject at least a portion of the molten material from the melt pool. Material can be seen ejected from the sample surface as a sheet tumbling in air as shown in top time sequence. This is the result of the cavitation of a melt layer. It is also possible to have the melt ejected by capillary wave excitation which forms a crown at the edge of the laser ablation crater and then breaks into droplets later in time (middle panel). As another pulse 12a is then produced, the melt pool is formed deeper below the surface of the material sample 22, and the pulse 14a again ejects a portion of material from the melt pool. Material removal from inside the partially drilled channel at later laser shots usually appears in one or a combination of two forms. One is the crown formation and breaking also seen sometime on the first shot. The other is a jet of liquid ejected out of the channel, likely resulted from the capillary wave dynamics, shown in the bottom time sequence. This process continues as pulses 12a and 14a are alternately applied (or applied with a small degree of overlap), and the melt pool is formed at deeper and deeper depths within the material sample 22, while the pulses 14a continue to eject material from the melt pool each time they are applied to the melt pool. Eventually a hole is formed through the entire thickness of the material sample 22 where the molten material from the melt pool has been fully ejected.

Figure 6A:
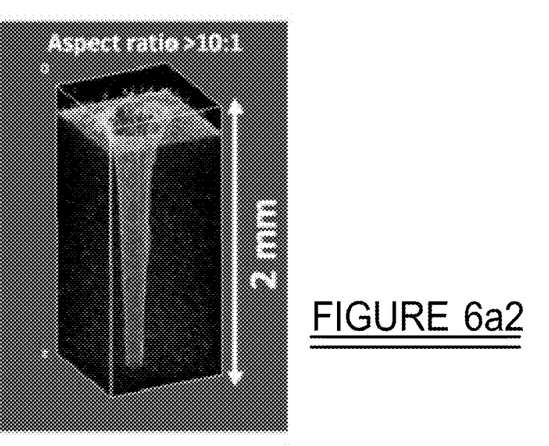
FIGS. 6a-6c illustrate an X-ray computed tomography used to inspect the laser drilled channels.
Figure 6A:
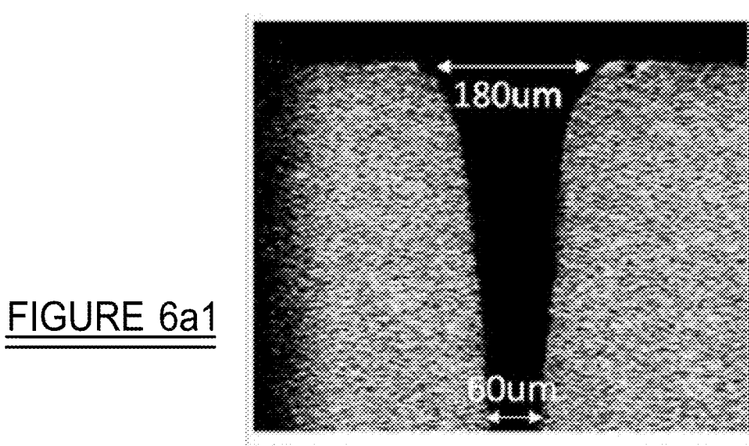
Figure 6B:
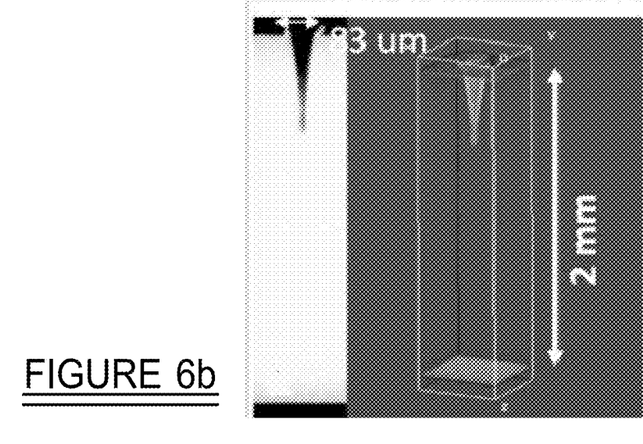
Figure 6C:
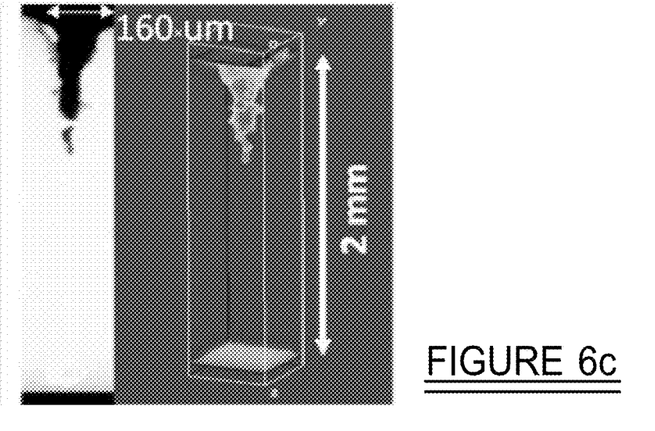

FIG. 6a-6c illustrate an X-ray computed tomography used to inspect the laser drilled channels. The 3D rendering and side view of typical channels in a 2-mm thick SS plate produced using gated CW+short pulse laser approach (FIGS. 6a1 and 6a2), short pulse only (FIG. 6b), and gated CW only (FIG. 6c) are shown. The gated CW+short pulse laser approach drilled channel walls that are smooth and with little cracks and roughness visible inside and around perimeter of the hole. The channel produced with short pulse laser only is also good quality in general, although only a partially drilled channel is produced in this sample since the average removal rate can be orders of magnitude slower. The gated CW laser drilled channel is much rougher with significant collateral damage. Channels produced in samples with different thicknesses and also in Al appear to have similar morphology and quality.

It will also be appreciated that while portions of the above description describe the material as being melted to form a melt pool by the first CW laser 12 before the short pulse from the short pulse laser 14 arrives, this is not needed in all applications. For example, it is possible that with certain materials other than metals, the CW laser 12 may heat the material but not to the point of actually melting the material, and then the short pulse may be applied. Put differently, with certain materials besides metals, it is not always necessary to create a melt pool before applying the second pulse.

The present disclosure thus provides a new and efficient method for melt removal in laser machining. Using a periodically modulated CW laser and a short pulse laser excites and amplifies the surface waves to achieve melt ejection. The methods disclosed herein may operation at a lower temperature than a conventional drilling and cutting laser system with considerably less energy absorbed in the ejection of material. The use of the CW laser 12 is about an order of magnitude more efficient that previously used pulsed lasers, which have traditionally been used for material removal. In addition, CW lasers are more compact and can be scaled in power/energy more easily than a pulsed laser. Augmenting the machining process by timed, short duration pulses from a pulsed laser, excites capillary wave excitation, and the ejection of material from the melt pool, even more efficiently and cleanly than is possible using just the CW laser. The methods disclosed herein can be applied for high speed aspect ratio hole drilling and further to increase cutting efficiency in a laser cutting operation.

The present disclosure therefore relates to a laser system which combines the use of a gated CW laser and a pulsed laser. The pulse laser produces the recoil momentum and initiate the melt ejection. The energy of melt motion is much smaller than melt thermal enthalpy. Almost all energy is delivered by the gated CW laser providing the high processing efficiency. The present disclosure may provide up to a 100 times increase, or possibly even higher, in removal rate compared to that achievable by single pulse laser systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A laser system for processing a material, the laser system comprising:
   a laser configured to intermittently generate independent first and second laser pulses, the first laser pulse having a first duration and a first average power, at a spot on a surface of the material being processed, and the second laser pulse having a second duration and a second peak power, the second peak power being at least about 100 MW and the second duration being shorter than the first duration by a factor of at least 1000, and directed at the spot, and the second laser pulse being generated after the first laser pulse is generated;
   the first duration being from microseconds or longer;
   the second peak power being larger by a factor of 1000 or greater than the first average power, and the second laser pulse having a lower energy than the first laser pulse;
   the first laser pulse from the laser is configured to at least heat the spot on the surface of the material to form a melt pool, while the second laser pulse induces material ejection from the spot.

2. The laser system of claim 1, wherein the laser comprises:
   a gated continuous wave (CW) laser; and
   a pulsed laser.

3. The laser system of claim 1, further comprising a controller for controlling the laser.

4. The laser system of claim 2, further comprising a controller for controlling the CW laser and the pulsed laser.

5. The laser system of claim 1, wherein the first duration comprises a duration of about 10 µs to 500 µs.

6. The laser system of claim 1, wherein the first laser pulse heats the spot to form a melt pool before the second laser pulse is applied.

7. The laser system of claim 1, wherein the second laser pulse is applied before the first laser pulse has formed a melt pool at the spot.

8. The laser system of claim 1, wherein the laser comprises a single pulsed laser amplifier.

9. A laser system for processing a material, the laser system comprising:
   a gated continuous wave (CW) laser producing a first laser pulse of a first duration in the microsecond range, and having a first average power, at a spot on a surface of the material being processed;
   a short pulse laser for producing a second laser pulse, independent of the first laser pulse, and having a second duration and a second peak power, the second duration being shorter than the first duration by a factor of at least $10^5$ and directed at the spot, and the second laser pulse being generated after the first laser pulse is generated;
   the second peak power being at least about 100 MW, and being larger by a factor of $10^5$ than the first average power, and the energy provided by the second laser pulse being lower than an energy provided by the first laser pulse; and
   the first laser pulse from the gated continuous wave (CW) laser is configured to at least heat the material at the spot up to a melt pool formation, while the short pulse laser induces material ejection from the spot.

10. The laser system of claim 9, wherein the second laser pulse is formed immediately upon ending the first laser pulse.

11. The laser system of claim 9, wherein the second laser pulse is formed prior to the first laser pulse ending, such that the first and second laser pulses overlap.

12. The laser system of claim 9, wherein the first and second laser pulses have the same spot size.

13. The laser system of claim 9, wherein the first duration comprises a duration of about 10 µs to 500 µs.

14. The laser system of claim 9, wherein the first average power comprises a power of about 250 W to 1500 W.

15. The laser system of claim 9, wherein the second peak power comprises a power of greater than about 100 MW.

16. The laser system of claim 9, wherein the pulse duration of the second laser pulse is nanoseconds or shorter, and the pulse duration of the first laser pulse is microseconds or longer.

17. The laser system of claim 9, wherein each of the gated continuous wave (CW) laser and the short pulse laser operate at a predetermined frequency.

18. The laser system of claim 17, wherein the predetermined frequency comprises a frequency of at least 10 Hz.

19. The laser system of claim 17, wherein the predetermined frequency comprises a frequency no higher than 50 Hz.

20. The laser system of claim 9, further comprising a controller for controlling the gated continuous wave (CW) laser and the short pulse laser.

21. A laser-based method for processing a material, the method comprising:
- using a laser to intermittently generate independent first and second laser pulses, the first laser pulse having a first duration and a first average power, at a spot on a surface of the material being processed, and the second laser pulse having a second duration and a second peak power, the second duration being between 1 µs and 100 µs, and the second peak power being at least about 100 MW and being larger by a factor of at least 1000 than the first average power, and the second laser pulse having a lower energy than the first laser pulse, the second laser pulse directed at the spot and being generated after the first laser pulse is generated;
- using the first laser pulse to at least heat the spot on the surface of the material up to a melt pool formation; and
- using the second laser pulse to induce material ejection from material being processed.

22. The laser-based method of claim 21, wherein the first laser pulse forms a melt pool at the spot on the surface of the material and the second laser pulse induces an ejection of molten material from the melt pool.

23. The laser-based method of claim 21, wherein using a laser comprises:
- using a gated, continuous wave (CW) laser to produce the first laser pulse; and
- using a pulsed laser to produce the second laser pulse.

* * * * *